United States Patent

[11] 3,553,447

| [72] | Inventors | Robert L. Zimmerman<br>Royal Oak;<br>David W. Sallberg, Farmington, Mich. |
|---|---|---|
| [21] | Appl. No. | 732,585 |
| [22] | Filed | May 28, 1968 |
| [45] | Patented | Jan. 5, 1971 |
| [73] | Assignee | Pegasus Laboratories, Inc.<br>Berkley, Mich.<br>a corporation of Michigan |

[54] STRUCTURE FOR AND METHOD OF LINEAR APPROXIMATION OF AN ARC
18 Claims, 3 Drawing Figs.

[52] U.S. Cl. .................................................. 235/197,
235/151.11
[51] Int. Cl. .................................................. G06g 7/28
[50] Field of Search ........................................... 235/197,
151.11, 151.12, 151, 184, 193; 318/20.135,
20.150, 20.645; 328/146, 150; 307/229, 235

[56] References Cited
UNITED STATES PATENTS

| 2,809,290 | 10/1957 | Kee ............................... | 235/197X |
| 2,925,220 | 2/1960 | Serrell ........................... | 235/197 |
| 2,975,369 | 3/1961 | Vance ............................ | 328/143 |
| 3,080,555 | 3/1963 | Vadus et al. ................... | 235/197X |
| 3,328,655 | 6/1967 | Tripp ............................. | 318/18 |
| 3,413,456 | 11/1968 | Sutton ........................... | 235/197X |
| 3,443,082 | 5/1969 | Abe ............................... | 235/197 |

*Primary Examiner*—Malcolm A. Morrison
*Assistant Examiner*—Joseph F. Ruggiero
*Attorney*—Whittemore, Hulbert and Belknap

ABSTRACT: Structure for providing a multiple linear segment approximation of an arcuate segment and the method of such approximation for use in pattern tracer servocontrols or the like is disclosed.

PATENTED JAN 5 1971 3,553,447

INVENTORS
ROBERT L. ZIMMERMAN
DAVID W. SALLBERG

BY Whittemore
Hulbert & Belknap
ATTORNEYS

STRUCTURE FOR AND METHOD OF LINEAR APPROXIMATION OF AN ARC

The structure disclosed includes a circuit for developing a signal to control a machining head in accordance with deflection of a pattern-tracing probe as represented by electric signals including a vector combination of X and Y axis signals and a Z axis signal. The circuit includes means for comparing the XY vector signal, plus a Z axis signal with a fixed reference signal in a first straight line approximation of an arc which straight line approximation is tangent to the arc at the midpoint thereof. The circuit disclosed also provides a difference signal which is the difference between the vector XY and the Z signal. When the absolute value of the difference signal is greater than a predetermined absolute value, means are provided in the circuit to vary the reference signal compared with the sum of the XY vector signal and the Z axis signal in second straight line approximations of the arc at each end of the first straight line approximation to complete the approximation of the arc with considerably reduced deviations therefrom as compared to a single straight line approximation of the arc.

The method disclosed includes combining a vector sum of relatively perpendicular X and Y axis tracing probe deviation signals with a Z axis probe deviation signal to provide a sum of the vector XY and Z axis signals, comparing the sum signal with a reference signal to provide a signal representing deviation from a first straight line approximation of an arc when the absolute value of the vector XY signal, minus the Z axis signal is below a predetermined value and modifying the reference signal after the vector XY signal minus the Z axis signal has a predetermined absolute magnitude to provide a signal representing deviation from different straight line approximations of the arc to complete the approximation of the arc with minimum deviation therefrom.

Any deviation of the sum of the XY vector signal and the Z axis signals from the respective reference signals is a circuit-error signal output used to position the pattern tracing probe. When the pattern tracing probe is following the straight line approximations of the arc selected, the error signal will be zero and the drive of the machining head and probe will not be changed.

BACKGROUND OF THE INVENTION

1. Field of the Invention

The invention relates to structure for and a method of control of servomechanisms or the like and refers more specifically to a method of straight line segment approximation of an arc and an electrical circuit for effecting the straight line approximation. The invention has particular use in control of servomechanisms operable in response to deflection of a probe tracing a three-dimensional pattern to effect duplication of the pattern by controlling a machining operation but is not limited to such applications.

2. Description of the Prior Art

In the past, pattern tracing controls, such as those disclosed in the Herndon U.S. Pat. No. 2,983,858, have approximated arcuate pattern surfaces which it has been desired to duplicate by means of a single straight line approximation of a curve in two dimensions. Thus, in the past a spherical surface, for example, has been approximated by a conical surface having a base defined by a circle included within the spherical surface and having an apex on the spherical surface.

The method of approximating, for example, a quarter circle in a single plane in the past has been to use a straight line passing through the quarter-circle at the ends thereof. Such approximations have in the past been provided, for example, by circuits wherein two electrical signals representing a vector XY signal and a Z axis signal have been added together and compared against a reference signal having a magnitude representing the radius of the circular segment.

With such straight line approximation of an arc, considerable deviation from the true arc has been present. In order to maintain increasingly stringent machining tolerances in pattern tracing applications, a better electrical approximation of an arc is required.

SUMMARY OF THE INVENTION

In accordance with the present invention an arcuate segment is approximated in a control circuit by a plurality of straight line segments, whereby a machining head may be moved more exactly in accordance with a pattern to be machined over which a tracing probe is moved with less deviation of the machining head from the traced pattern than is possible with single straight line approximations of an arcuate segment of the pattern.

In accordance with the invention, X and Y deflection of a tracing probe is added to Z-deflection of the tracing probe and compared against a first reference signal in a first straight line segment approximation of an arc, tangent to the arc at the midpoint thereof. When the absolute value of the X and Y deflection of the tracing probe minus the Z deflection of the tracing probe has a predetermined value, the reference signal is changed to provide different straight line segment approximations of the arc at the ends of the arc. Thus, a true arc is more nearly approximated by the three straight line segments than by a single straight line segment passing through the ends of the arc to form a chord thereof.

An error signal is provided when the straight line approximations of the arcuate segment are not being followed by the tracing probe. That is, when the deflection of the tracing probe on a pattern surface is such that the circuits sensing the deflection provide a signal representing the three-segment straight line approximation of the arc, no error signal will be provided to correct the movement of the tracing probe and the correspondingly moved machining head. When the deflection of the tracing probe is such that the three-segment straight line approximation of the arcuate segment is not followed by the tracing probe, an error signal will be provided to correct the movement of the tracing probe and machining head.

DESCRIPTION OF THE PREFERRED EMBODIMENT

Figure 1:
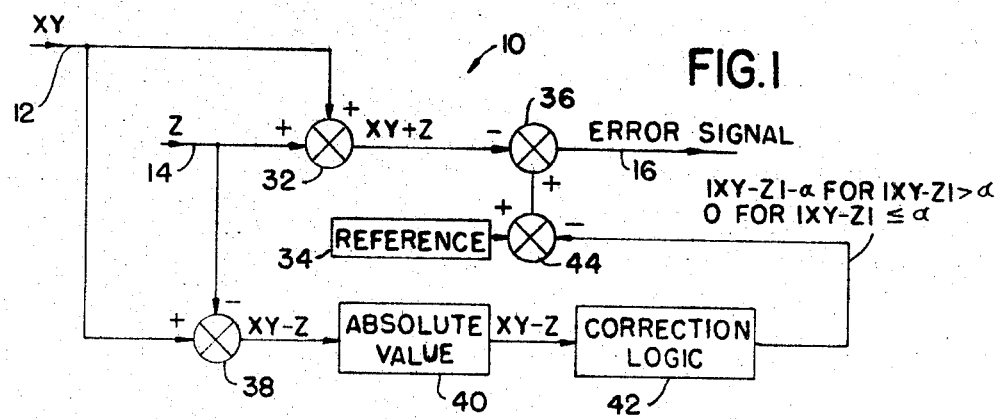
FIG. 1 is a block diagram of a circuit for providing a linear segment approximation of a curve in a servosystem or the like constructed in accordance with the invention.

The circuit 10 of FIG. 1 is provided in accordance with the invention to receive a signal, which is a vector addition of electrical signals representing deflection of a tracing probe in the usual tracing apparatus along X and Y axes which are perpendicular to each other in, for example, a horizontal plane, on the conductor 12 and to receive a signal on conductor 14 representative of the displacement of the tracing probe along a Z or vertical axis perpendicular to the plane of the XY axis. The output of the circuit 10 is an error signal on the conductor 16 which may be fed to the servomechanism of the tracing system to correct the travel of a machining tool, of for example a milling machine, whereby a pattern may be traced and an exact copy thereof machined in accordance with the usual tracing-machining procedure.

Figure 3:
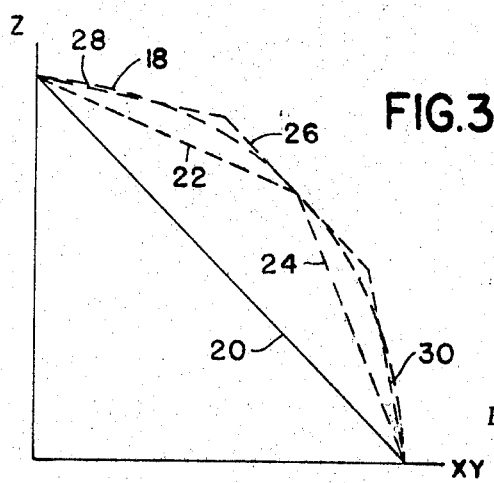
FIG. 3 is a diagram useful in explaining the development of a linear approximation of a curve in accordance with the structure and method of the invention.

In the past, circuits, similar to circuit 10, have been provided which add the XY and the Z input signals and compare them to a reference signal having, for example, a value representing the radius of a circular segment 18 in the XY and Z plane, as illustrated in FIG. 3. A straight line approximation of the circular segment 18 is the straight line 20 which deviates from the circular segment substantially. A better approximation of the circular segment 18 can be effected if the segment 18 is approximated by the two linear segments 22 and 24 having adjacent ends intersecting at the midpoint of the circular segment 18 and opposite ends passing through the circular segment at the ends thereof, again as shown in FIG. 3. An even better approximation of the circular segment 18 is provided by the linear segments 26, 28 and 30, again as shown in FIG. 3.

The circuit illustrated in FIG. 1 includes a first comparator 32 for finding the sum of the vector XY and the Z input signals, a reference signal source 34 and a comparator 36 for comparing the output of the comparator 32 and the reference signal from the reference-signal source 34. When the XY and Z input signals define the linear segment 26, the output signal on conductor 16 will be zero, as long as the absolute value of the difference between the XY and Z signals is equal to or below a predetermined value.

The circuit 10 of FIG. 1 further includes the comparator 38 for providing a difference signal output representing the difference between the vector XY input signal and the Z input signal, means 40 for providing the absolute value of the difference signal and logic circuit means 42 for receiving the absolute value of the difference signal from the means 40 and providing a correction signal to the comparator 44 when the absolute value of the difference signal is greater than a predetermined value.

The correction signal and the reference signal from the reference signal source 34 are compared in the comparator 44 to provide a modified reference signal to the comparator 36 for comparing with the sum signal from the comparator 32. When the correction signal is present the XY and Z signals will define either the segment 28 or the segment 30 when the output on conductor 16 is zero depending on whether the XY signal or the Z signal is larger when the correction signal is initiated.

Figure 2:
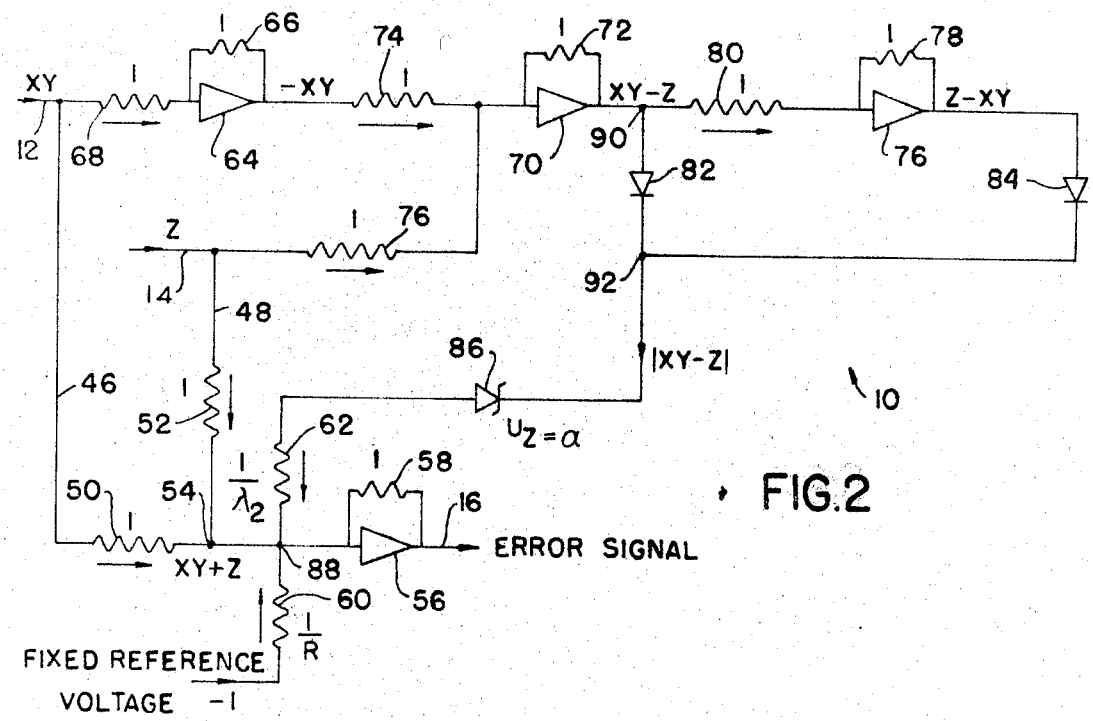
FIG. 2 is a schematic diagram of the circuit illustrated in FIG. 1.

As shown in more detail in FIG. 2, the comparator 32 of the circuit 10 includes the conductors 46 and 48 along with the resistors 50 and 52 which provide a signal which is the sum of the vector XY input signal on conductor 12 and the Z axis input signal on the conductor 14 at the junction 54. The comparator 36 includes the operational amplifier 56 and its parallel resistor 58 and the input resistances 50 and 52 through which the XY and the Z signals are passed and the resistances 60 and 62 through which the reference signal from the reference signal source 34 and from the correction logic circuit 42 are passed to the operational amplifier 56.

The comparator 38 includes the operational amplifier 64, its parallel resistance 66 and input resistance 68 and the resistance 76 along with operational amplifier 70 and parallel resistance 72 which provide the signal $XY - Z$ at junction 90.

The absolute value circuit 40 includes the operational amplifier 76, its parallel resistor 78 and input resistor 80. The diodes 82 and 84 isolate the operational amplifiers 70 and 76 and the predetermined absolute value above which the reference signal from reference signal source 34 is varied to provide the second and third linear approximations 28 and 30 is determined by the zener diode 86.

The method of operation of the circuit 10, as particularly shown in the schematic diagram of FIG. 2, is as follows. A vector XY signal from a tracing probe, many of which are known in the art, and which XY signal will describe a circle in, for example a horizontal plane, is provided on the conductor 12. A Z signal, also from the tracing probe, is provided on the conductor 14. The XY and Z signal which is combined with the reference signal $\frac{1}{R_2}$ at the junction 88 to provide an output signal from the conductor 16 equal to the reference voltage $R_2$ minus the absolute value of the $XY + Z$ signal for all absolute values of $XY - Z$ greater than or equal to a predetermined value $\alpha$. With the value $R_2$ properly chosen initially the error value $R_2 - (XY + Z)$ will be zero when $XY + Z$ define the linear segment 26 tangent to the circular segment 18 at the midpoint thereof, as shown in FIG. 3.

The XY signal from the conductor 12 is also passed through the operational amplifier 64 where it is inverted in polarity and passed to the operational amplifier 70 through the resistor 74. The Z signal is passed directly to the operational amplifier 70 through the resistor 76. The signal out of the operational amplifier 70 is an $XY - Z$ signal at junction 90. The $XY - Z$ signal at junction 90 is passed through the resistor 80 to the operational amplifier 76 where it is inverted to provide a $Z - XY$ signal out of the operational amplifier 76.

Diodes 82 and 84 block negative signals from the operational amplifiers 70 and 76 so that the absolute value of the $XY - Z$ signal presented to the zener diode 86 is positive. When the positive polarity absolute value of the signal $XY - Z$ is greater than a predetermined value $\alpha$, the Zener diode 86 conducts, whereby a correction signal equal to $\lambda_2$ times the absolute value of the $XY - Z$ signal minus $\alpha$ will be subtracted from the previous error signal $R - (XY + Z)$. The corrected error signal will again be zero on conductor 16 when the linear segment 28 or 30, as shown in FIG. 3, is traced by the tracing probe as before.

While one embodiment of the present invention providing a three-segment linear approximation of a circular segment 18 is disclosed, it will be understood that the principles disclosed can be applied to two, four or more linear-segment approximations of circular segments or other arcuate segments. It is therefore the intention to include all modifications and embodiments of the invention as are defined by the appended claims within the scope of the invention.

We claim:

1. A circuit for implementing linear-segment approximation of an arcuate segment comprising means for providing the sum of two signals, means for providing a signal which is the difference of the two signals, means for receiving the difference signal and providing the absolute value of the difference signal, means for comparing a reference signal to the sum of the two signals when the absolute value of the difference signal is less than a predetermined value to provide a first linear signal approximating a first portion of the arcuate segment, means for providing a correction signal when the absolute value of the difference signal is greater than the predetermined value and means for correcting the reference signal in accordance with the correction signal when the difference signal is greater than the predetermined value to provide a plurality of other linear signals approximating other portions of the arcuate segment.

2. Structure as set forth in claim 1 wherein one of the two signals is a vector sum of a pair of signals representing a pair of perpendicular axes on a three-dimensional model.

3. Structure as set forth in claim 2 wherein the other of the two signals represents a third axis perpendicular to the other two axes of the three-dimensional model.

4. Structure as set forth in claim 1 wherein the means for comparing a reference signal to the sum of the two signals when the absolute value of the difference signal is less than a predetermined value comprises a first operational amplifier having input circuits for receiving the sum of the two signals and the reference signal.

5. Structure as set forth in claim 4 wherein the means for receiving the difference signal and providing the absolute value of the difference signal comprises a second operational amplifier and a pair of diodes connected on one side at the input and output of the second operational amplifier and connected together at the other side.

6. Structure as set forth in claim 5 wherein the means for providing a correction signal when the absolute value of the difference signal is greater than the predetermined value comprises a zener diode connected between the other side of the diodes and an input circuit of the first operational amplifier.

7. Structure as set forth in claim 6 wherein the means for correcting the reference signal in accordance with the correction signal when the difference signal is greater than the predetermined value comprises a resistor connected in series between the zener diode and the input of the first operational amplifier.

8. The method of providing a signal approximating a signal representing an arcuate segment, comprising establishing a first signal representative of a straight line approximation of a portion of the arcuate segment and subsequently altering the first signal to establish a plurality of other signals sequentially representative of sequential straight line approximations of other sequential portions of the arcuate segment in response to a predetermined deviation of the first and the subsequent sequential signals a predetermined amount from the signal representing the arcuate segment.

9. The method of claim 8 wherein the first straight line approximation signal is provided by comparing the sum of two signals with a reference signal.

10. The method of claim 9 wherein a second and third of the plurality of other straight line approximation signals are effected by varying the reference signal when the absolute value of the difference of the two signals is greater than a predetermined value.

11. A circuit for approximation of an arcuate segment comprising means for providing the sum of two signals, means for providing a signal which is the difference of the two signals, means for receiving the difference signal and providing the absolute value of the difference signal, and means for comparing a reference signal to the sum of the two signals when the absolute value of the difference signal is less than a predetermined value to provide a linear signal approximating the arcuate segment.

12. Structure for providing a signal approximating a signal representing an arcuate segment, comprising means for providing a first signal representative of a straight line approximation of a first portion of the arcuate segment, and means for receiving the first signal and subsequently altering the first signal to establish a plurality of other signals sequentially representative of sequential straight line approximations of other sequential portions of the arcuate segment in response to a predetermined deviation of the first and the subsequent plurality of other signals a predetermined amount from the signal representing the arcuate segment.

13. Structure as set forth in claim 12 wherein the means for providing the first signal representative of a straight line approximation of a first portion of the arcuate segment comprises means for comparing the sum of two signals with a reference signal.

14. Structure as set forth in claim 13 wherein the means for altering the first signal to establish a plurality of other signals includes means for varying the reference signal when the absolute value of the difference of the two signals is greater than a predetermined value.

15. The method of implementing linear approximation of an arcuate segment comprising providing the sum of two signals, providing the difference of the two signals and comparing a reference signal to the sum of the two signals when the absolute value of the difference signal is less than a predetermined value to provide a linear signal approximating the arcuate segment.

16. The method as set forth in claim 15 and further including the step of providing a correction signal when the absolute value of the difference signal is greater than the predetermined value and correcting the reference signal in accordance with the correction signal when the difference signal is greater than the predetermined value to provide a plurality of other linear signals approximating other portions of the arcuate segment.

17. The method as set forth in claim 16 wherein one of the two signals is a vector sum of a pair of signals representing a pair of perpendicular axes on a three-dimensional model.

18. The method as set forth in claim 17 wherein the other of the two signals represents a third axis perpendicular to the other two axes of the three-dimensional model.